(12) United States Patent
Mahindru et al.

(10) Patent No.: US 9,104,463 B2
(45) Date of Patent: Aug. 11, 2015

(54) AUTOMATED AND OPTIMAL DEACTIVATION OF SERVICE TO ENABLE EFFECTIVE RESOURCE REUSABILITY

(71) Applicant: International Business Machines Corporation, Armonk, NY (US)

(72) Inventors: Ruchi Mahindru, Elmsford, NY (US); Suraj Subramanian, Lafayette, LA (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/670,806

(22) Filed: Nov. 7, 2012

(65) Prior Publication Data

US 2014/0130043 A1      May 8, 2014

(51) Int. Cl.
G06F 9/455      (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,829,734 B1 | 12/2004 | Kreulen et al. | |
| 7,577,701 B1 | 8/2009 | Johns et al. | |
| 7,577,722 B1 * | 8/2009 | Khandekar et al. | 709/220 |
| 7,779,349 B2 | 8/2010 | Spangler | |
| 7,992,033 B2 | 8/2011 | Childress et al. | |
| 8,352,608 B1 * | 1/2013 | Keagy et al. | 709/226 |
| 2006/0080364 A1 | 4/2006 | Lake | |
| 2008/0034060 A1 | 2/2008 | Fisher, Jr. | |
| 2008/0086345 A1 | 4/2008 | Wilson et al. | |
| 2008/0091454 A1 | 4/2008 | Fisher, Jr. | |
| 2008/0134178 A1 * | 6/2008 | Fitzgerald et al. | 718/1 |
| 2008/0172574 A1 | 7/2008 | Fisher | |
| 2009/0288084 A1 * | 11/2009 | Astete et al. | 718/1 |
| 2011/0040590 A1 | 2/2011 | Nielsen et al. | |
| 2011/0046993 A1 | 2/2011 | Nielsen et al. | |
| 2011/0046994 A1 | 2/2011 | Nielsen et al. | |
| 2011/0046999 A1 | 2/2011 | Nielsen et al. | |
| 2011/0258621 A1 * | 10/2011 | Kern | 718/1 |
| 2012/0089980 A1 * | 4/2012 | Sharp et al. | 718/1 |
| 2013/0060946 A1 * | 3/2013 | Kenneth et al. | 709/226 |
| 2013/0152079 A1 * | 6/2013 | Heyman et al. | 718/1 |
| 2013/0212576 A1 * | 8/2013 | Huang et al. | 718/1 |
| 2013/0275975 A1 * | 10/2013 | Masuda et al. | 718/1 |
| 2013/0290954 A1 * | 10/2013 | Dorland et al. | 718/1 |
| 2013/0332924 A1 * | 12/2013 | Shaposhnik et al. | 718/1 |
| 2014/0068600 A1 * | 3/2014 | Ashok et al. | 718/1 |

\* cited by examiner

*Primary Examiner* — Kenneth Tang
(74) *Attorney, Agent, or Firm* — Scully, Scott, Murphy & Presser, P.C.; Louis J. Percello, Esq.

(57) ABSTRACT

Automated deactivation of service to enable effective resource reusability in a computing system, may include receiving a request to destroy a virtual machine, the virtual machine running in a virtual data center comprising one or more software components allocated for servicing a customer. In response, a provisioning module may be notified to remove the virtual machine. Based on the number of resources determined to be left as available, deactivation of pending actions on the virtual machine may be performed at the time the virtual machine is being removed or as an automatic scheduled job to be performed at a scheduled time.

24 Claims, 5 Drawing Sheets

| TABLE NAME | LIST OF FIELDS |
|---|---|
| VMAsset | UNIQUE_VMID, customer_Name, VM_State, Cloud_Instance_Id |
| TICKET | UNIQUE_VMID, Ticket_Num, Ticket_Status, Ticket_Details |
| PATCH | UNIQUE_VMID, OS, SoftwareId, LastPatchDate, CurrentPatchLevel, PatchSchedule |
| IDENTITYMANAGEMENT | UNIQUE_VMID, UserID, GROUP, MemberOf |
| IPResource | UNIQUE_VMID, VM_IPAdress, IP_Status |
| BACKUP | UNIQUE_VMID, AssetBackupList, Schedule |

FIG. 2

AUTOMATED AND OPTIMAL DEACTIVATION OF SERVICE TO ENABLE EFFECTIVE RESOURCE REUSABILITY

FIELD

The present application relates generally to computers and computer applications, and more particularly to automatic and optimal deactivation of managed services to enable effective resource reusability.

BACKGROUND

In information technology (IT) management, enterprises are moving from physical servers toward virtualization, virtual machines (VMs) and cloud computing, for example, mainly because a virtual environment provides reduced cost through better resource utilization, standardization and simplified maintenance. The concept of virtual machines and cloud computing allows an enterprise to run its IT without actually having to own the physical infrastructure associated with computing systems. Instead, a provider (referred to herein as a service provider) provides the physical computing infrastructure and enables the enterprise to run its IT applications utilizing the service provider's physical computing infrastructure typically over a network such as the Internet, for example, for the duration that the enterprise needs to run such IT applications. In another aspect of could computing, a provider may provide software and/or one or more services on one or more virtual machines to a customer.

In cloud environments, virtual machines or the like virtual servers have transient lifetimes. A user can destroy VMs at will and without notice. However, there may be pending actions on these VMs either through specific customer requests or automated event actions raised by an associated cloud monitoring system. For example, in strategic outsourcing (SO) and cloud environment, problem tickets are opened for events causing problems, to be resolved by system administrators. Opening, handling and closing of each such problem ticket costs time and effort. Hence, such pending actions cost the service provider money and time. In this disclosure, an approach is described to track down pending actions and auto-close them.

BRIEF SUMMARY

A method for automated deactivation of managed service to enable effective resource reusability in a computing system, in one aspect, may comprise receiving a request to destroy a virtual machine, the virtual machine running in a virtual data center (e.g., on a computing hardware platform), the virtual data center comprising one or more software components allocated for servicing a customer. The method may also comprise notifying a provisioning module to remove the virtual machine. The method may further comprise determining a number of resources left available in the virtual data center. The method may also comprise, in response to determining that the number of resources left available is less than a defined threshold value, sending a notification to one or more modules that manage activities associated with the virtual machine to disable managing the activities, closing all pending activities on the virtual machine, and releasing all resources used by the virtual machine concurrently with the provisioning module removing the virtual machine. The method may further comprise, in response to determining that the number of resources left available is greater than or equal to the defined threshold value, scheduling the sending, the closing and the releasing to be performed at a scheduled time.

A system of automated deactivation of managed service to enable effective resource reusability in a computing system, in one aspect, may comprise a service management system operable to receive a request to destroy a virtual machine running in a virtual data center (e.g., on computing hardware platform), the virtual data center comprising one or more software components allocated for servicing a customer. The service management system may be further operable to notify a provisioning module executing in the virtual data center to remove the virtual machine. The service management system may be further operable to determine a number of resources left available in the virtual data center. In response to determining that the number of resources left available is less than a defined threshold value, the service management system may be further operable to send a notification to one or more modules that manage activities associated with the virtual machine to disable managing the activities, closing all pending activities on the virtual machine, and releasing all resources used by the virtual machine concurrently with the provisioning module removing the virtual machine. In response to determining that the number of resources left available is greater than or equal to the defined threshold value, the service management system may be further operable to schedule the sending, the closing and the releasing to be performed at a scheduled time.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 2 shows a list of table or like data structures employed in one embodiment of the present disclosure.

DETAILED DESCRIPTION

In virtualized environments, computing services, servers or VMs may be provisioned and de-provisioned, as needed or requested by a customer. For instance, in virtual environments, resources allocated to a VM may be released and reused after the VM is removed or de-provisioned. An example of such resource may be an internet protocol (IP) address allocated for accessing the VM and various applications running on the VM. Another example of such resource may be the time a service provider spends on care and managing the VM. A method and system are provided in the present disclosure that optimize the returning of such resources for reuse when a VM is removed from service.

In one aspect, the methodologies of the present disclosure work in the context of Cloud. For example, a customer buys and obtains services from the Cloud, and VMs/virtual servers are a component of the service received. When a customer buys a service from the Cloud, a methodology of the present disclosure may attach a set of compute resources to each of the VMs associated with the service. In addition, issues raised against the infrastructure associated with the Cloud involve steady state support and processes that are in flight at any given time. These processes are in various states of completion with (often) several people attending to these processes. When a service is terminated (e.g., because the customer no longer requires it), both compute and steady state support resources have to be deactivated. A methodology of the present disclosure in one embodiment shows how this deactivation will occur to optimally free up resources, both system and people.

Figure 1:
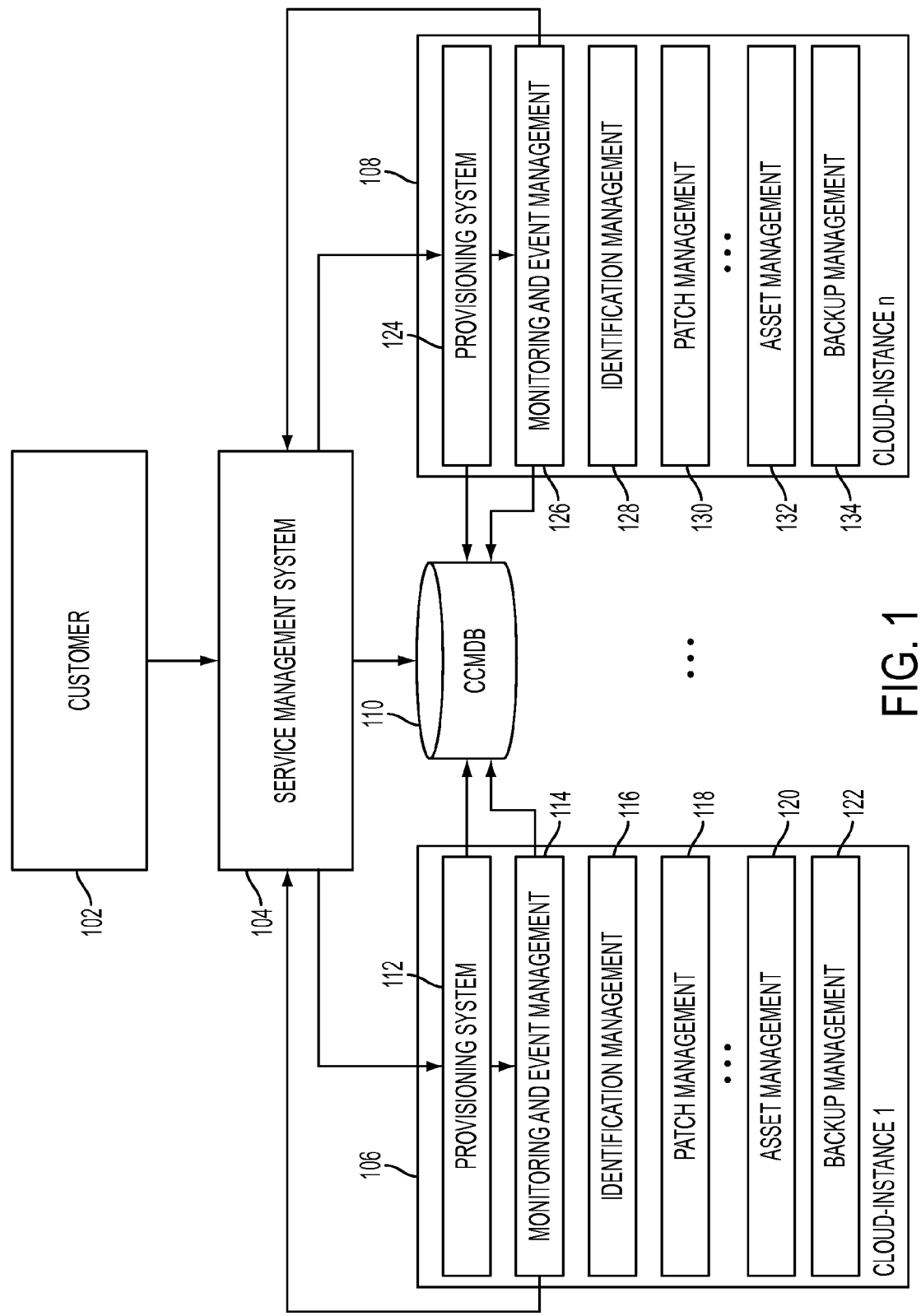
FIG. 1 illustrates high level architecture of a system implementing automated deactivation of managed services associated with VMs in one embodiment of the present disclosure.

FIG. 1 illustrates high level architecture of a system implementing automated deactivation of tickets and/or other pending activities in one or more VMs that are de-provisioned in one embodiment of the present disclosure. A customer 102 may interact with a service management system to provision new virtual machines, create a change to modify or remove a configuration of the previously provisioned virtual machines or create a problem ticket to report an issue with the provisioned virtual machines.

A cloud-instance (e.g., shown at 106, 108) refers to instance of a management stack, infrastructure, and physical computing hardware running in a separate proximity, location that all together provides a platform that can be used by customers to provision virtual machines providing software and/or service, for example, a virtual data center. A virtual machine refers to an operating system loaded as a guest operating system on a physical computing hardware or infrastructure provided by a service provider, for a customer to run their applications, typically remotely via a network such as the Internet.

A Service Management System 104 may be a computer module or the like executable on a processor, and that interacts with multiple cloud instances. A computing service provider may provide, with each cloud instance (e.g., 106, 108), a number of modules or functionalities that perform one or more tasks in provisioning and managing a virtual machine and related services to a customer. For example, a Provisioning system (e.g., 112, 124) may create, modify and remove a VM. A Monitoring and Event Management system (e.g., 114, 126) may monitor the status of the VM, for example, monitoring for any occurrence of problems and creating and logging problem tickets. An Identification Management system (e.g., 116, 128) may manage identifiers of one or more users utilizing the VM, and other identifiers used in the VM. A Patch Management system (e.g., 118, 130) may manage patches or updates in codes or data associated with the VM and one or more applications running on the VM. An Asset Management system (e.g., 120, 132) may manage assets of the VM, for example, data assets such as licenses and files, resources, and others. A Backup Management system (e.g., 122, 134) may manage backing up of the VM and associated data.

While a VM is running, multiple sources can create incident tickets against the VM. For instance, for VM instance at 106, Monitoring and Event Management 114 and/or Patch Management system 118 may log problems and automatically create incident tickets, logging the created tickets in the configuration and change management database (CCMDB) 110. A customer and/or support staff may also create such incident/problem tickets as well, which tickets may be also logged in the CCMDB 110. Likewise may occur with other VMs, e.g., 108.

Consider IP addresses that are reused after N time duration, where N>C+T, where T is time taken to destroy the VM and C is the deactivation time. The method and system of the present disclosure in one embodiment may optimally determine the deactivation time. In the optimal case, C+T is at most T because part of the deactivation can be done in parallel to VM destruction like closing the incident/problem ticket records, updating the patch system to remove the managed system, updating the monitoring and event management system to disable monitoring, releasing assets associated with the system being de-provisioned, and other deactivation activities. Thus, C may occur in real time with the VM destruction, or C may be occur at a later time, for example, as part of a cron-job or another job that is performed periodically at a configured interval.

A Central Service Management System 104 may create tickets for the multiple cloud instances (e.g., 106, 108). New incident creation is blocked. Event Management is aware of the VM state maintained in Service Management System and takes it into consideration upon incident creation.

The method and system of the present disclosure, in one aspect, automatically deactivate the various services associated with the system being de-provisioned. For instance, any pending incidents (e.g., with status of new or in-progress) such as problem tickets and other pending actions on the system (e.g., VM), may be automatically closed, irrespective of priority or impact for de-provisioned assets. Closing those incidents saves system administrator's time and effort on so called orphan incidents.

In another aspect, optimal (time-based) solution may be chosen for automatically deactivating the pending actions given the availability of the resources, for instance, IP addresses (reused resource) per cloud instance. Therefore, IP addresses or other resources can be released as soon as possible (with delay of at most VM destruction time T). Accordingly, in one embodiment of the present disclosure, the automatic deactivation of managed services may occur as event-based in real-time, and/or periodically at a specified time interval, which time interval may be configurable.

In one embodiment of the present disclosure, event-based automatic deactivation of managed services may work as follows. A Provisioning System 112 may begin the process of removing a VM in response to a request from a customer. The Provisioning System 112 may determine the availability of resources taken up by VM as part of the removal procedure. If the available resource such as the number of available IP addresses is less than a minimum required configurable threshold, then the Provisioning System 106 may send an event to the Event Management System 114 indicating that the VM is being de-provisioned. In response, the Event Management System 114 automatically closes all the pending incidents for that VM, for instance, which may have been stored in CCMDB 110. The current state of VM is leveraged to restrict any new incidents from getting created while the VM is still being de-provisioned. Deactivation of managed services happens prior to completion of VM de-provision or substantially at the same time. This approach updates ticket status in Event Management System 114.

In another aspect, the automatic deactivation of managed services may occur, for example, as a cron-job, or such scheduled job that is executed periodically and automatically by a system, during which an aggregated sweep at a scheduled time for all the VMs in de-provisioned state may occur. Service Management System 104 may remove the associated data from CCMDB 110.

In one embodiment of the method and system of the present disclosure, the following tables and data may be maintained, for example, in the Service Management System 104 central to all cloud instances (e.g., 106, 108) being managed for a customer 102. FIG. 2 shows a list of table or like data structures employed in one embodiment of the present disclosure.

A VM Asset table may keep track of VMs uniquely across the system. The VM Asset table may include VM_IPaddress (IP address allocated to VM), customer_Name (name of the customer provisioning VM), VM_State ('Provisioned', 'De-provision In Progress', 'De-provisioned'), UNIQUE_VMID (unique identifier associated with VM), Cloud_Instance_Id (identifier associated with cloud instance).

A Ticket table may keep track of tickets created per VM. The Ticket table may include UNIQUE_VMID (unique identifier associated with VM), Ticket_Num (identifier or number associated with a ticket), Ticket_Status (status of a ticket), Ticket_Details (detailed information describing the ticket).

A Patch table may keep patch schedule of each VM. The Patch table may include UNIQUE_VMID (unique identifier associated with VM), OS (operating system identification), SoftwareId (identification of application for patching), LastPatchDate (last date the application was patched or updated), CurrentPatchLevel (patch version), PatchSchedule.

An Identity Management table or IDM table may keep track of all the identifiers associated with the VM, and may include UNIQUE_VMID (unique identifier associated with VM), UserId, Group and MemberOf to represent the IDs such as one or more user identifiers that uses the VM.

An IPResource table may keep track of the available resources, e.g., IP addresses, per cloud instance. The IPResource table may include VM_IPAddress (IP address associated with VM), IP_Status ('Used', 'Unused').

A Backup table may keep track of different assets to back up for a customer on a VM. The backup table may include a list such as UNIQUE_VMID, AssetBackupList, Schedule that is the schedule duration to take the backup.

A Lower_IPReserve is a configurable threshold set to maintain the least number of resources such as IP addresses required to avoid resource limitation.

An Upper_IPReserve is a configurable threshold set to maintain the least upper limit of resources such as IP addresses required to avoid resource limitation.

It should be understood that other data structure or tables may be utilized in implementing a method and system of the present disclosure.

A method in one embodiment of the present disclosure deactivates a VM or the like service, e.g., to enable effective resource reusability. A customer may submit a request to de-provision a VM, and a system of the present disclosure (e.g., a service management system or module, or the like service management module, shown in FIG. 1 at 104) may receive the request. The service management module may set the status of the VM to a de-provision state. For example, the service management module may submit a request to set the VM_State='De-provision Inprogress' in the entry associated with this VM in VMAsset table. Based on the updated VM state, a provisioning system or the like module may begin to de-provision or destroy the VM, e.g., identified by the unique VM identifier (ID). The provisioning system de-provisions the VM and sets the VM_State='De-Provisioned'. An event management system or the like module may be also notified of the change in the status of this VM to 'De-provisioned'. In response, the event management system or the like module may disable or stop the monitoring of the VM.

The service management module may also determine whether the deactivation of managed services should take place now in real time or later at a delayed time, for example, as part of a time-based job scheduler such as cron job or the like. In one embodiment of the present disclosure, the decision of whether the deactivation of managed services should take place now as event-based or later as part of a periodic scheduled job, may be determined based on the number of unused resources, or the number of resources currently available, for example, as compared to a threshold value or values which specifies the minimum level of available resource or resources that should be maintained.

For example, considering IP addresses as an example of such a resource, the customer name (e.g., customer_Name) and the IP address of the VM (e.g., VM_ipaddress) requested to be destroyed is determined, and the VMAsset table is looked-up to determine the unique VM identifier (e.g., UNIQUE_VMID) and the cloud instance identifier (e.g., cloud_instance_id) associated with the customer name and the VM IP address. Using the cloud_instance_id, the number of 'Unused' IP addresses may be retrieved from the IPAddress table. The retrieved number of 'Unused' IP addresses may be saved in NUM_IP. If the number of 'Unused' IP addresses is less than the Lower_IPReserve threshold value, then the deactivation of managed services may be event-based, i.e., performed in real time with the destruction of the VM, e.g., so that the number of available resources would be maintained at least at a configured minimum level. Thus, event-based deactivation of managed services takes place, which may include closing the pending actions and incident/problem tickets. For example, for all pending activities and/or tickets that are open and associated with this VM (e.g., identified by its unique VM ID), the status is changed to 'closed.' The resources used by the VM are released.

If the number of unused resources, e.g., NUM_IP is greater than or equal to a threshold minimum, e.g., Upper_IPReserve, the deactivation of managed services associated with the removal of VM may be scheduled as a job to take place at a scheduled time. Hence, the deactivation of managed services may be performed via a cron-job or the like job at the scheduled time. During the scheduled time, automatic closing of tickets and releasing of resources may take place.

The event-based deactivation of managed services may include Provisioning System or the like module sending notification to Event Management system or the like, Patch Management system or the like, Backup System or the like module, and Identification Management system or the like with unique VM identifier (UNIQUE_VMID) of the VM being de-provisioned to disable monitoring, patching, backup activities, and activities associated with user identifiers, respectively. There may be other systems or modules associated with managing of the VM. Those other system or modules may also be notified so that their functionalities associated with the VM may be disabled.

In another embodiment, a Service Management system may send notification to the Event Management system or the like module with unique VM identifier (UNIQUE_VMID) associated with the VM being de-provisioned to disable monitoring.

A cron-job or the like scheduled job receives all unique VM identifiers (e.g., UNIQUE_VMID) respectively associated with all VMs whose VM_State='De-provisioned' since the last run of the cron-job or the like scheduled job, and performs the closing of problem/incident tickets and releasing of resources for each unique VM identifier (e.g., UNIQUE_VMID).

Automatic closing of tickets may include a processing that identifies tickets and/or pending activities opened by various systems such as event management, customer, support, backup and patch with status equal to 'not closed' for a given unique VM identifier (e.g., UNIQUE_VMID) and automatically closes the tickets and/or pending activities. Pending actions that may be scheduled at periodic basis should be cancelled. Examples of such actions may be patching, automated password renewal, license renewal, disk cleanup, empty recycle bin, and others.

The resources may then be released. For example, the record with VM_State equal to 'De-provisioned' or like is deleted from VMAsset table, delete; All the records for the VM being destroyed are deleted from the Patch table; All the identifiers associated with the VM being destroyed are deleted from IDM table; the IP_Status per IP address is updated to 'Unused' in IPResource table.

Figure 3A:
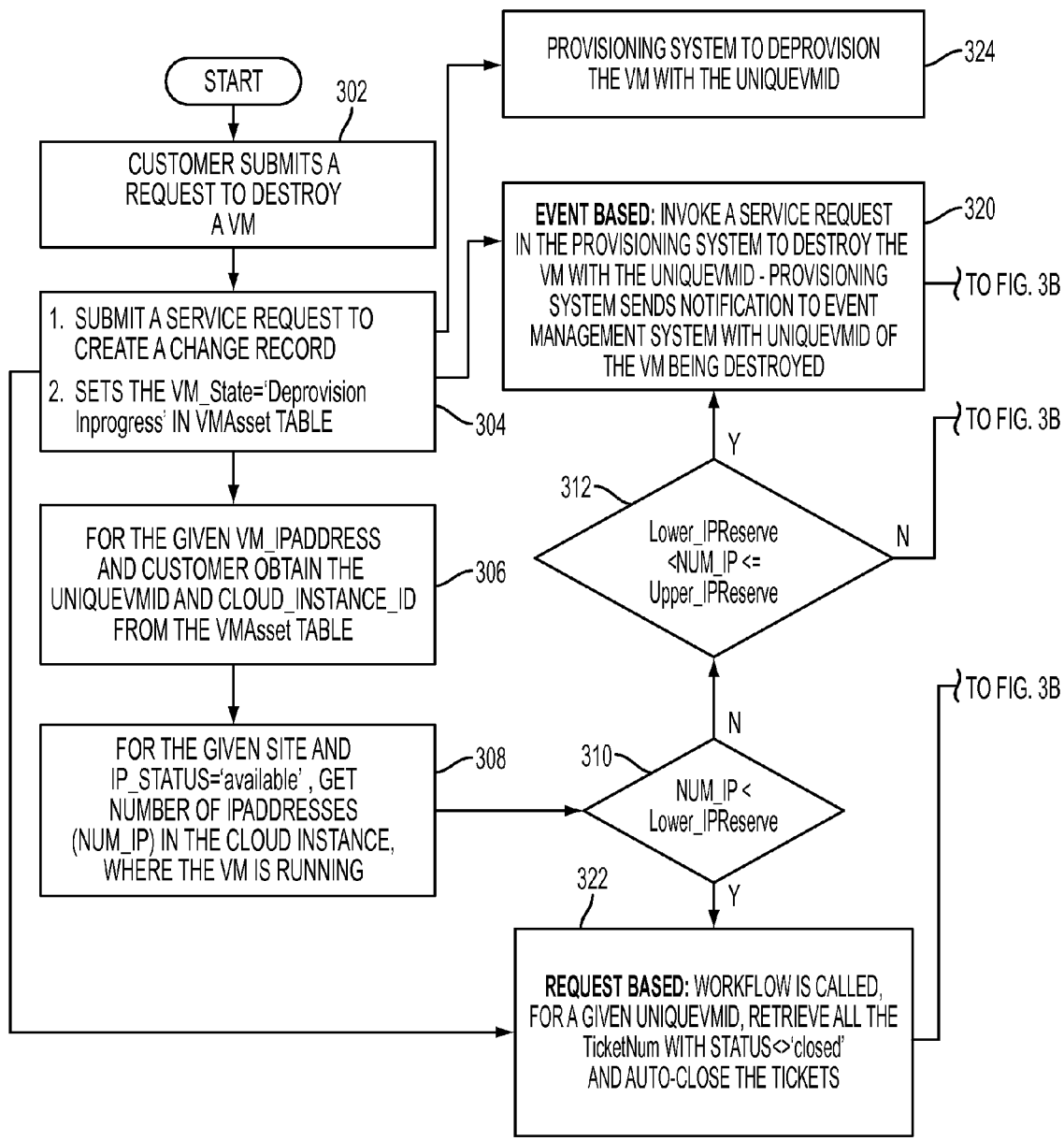
FIGS. 3A and 3B are a flow diagram illustrating a method in one embodiment for deactivating a VM or the like service to enable effective resource reusability.
Figure 3B:
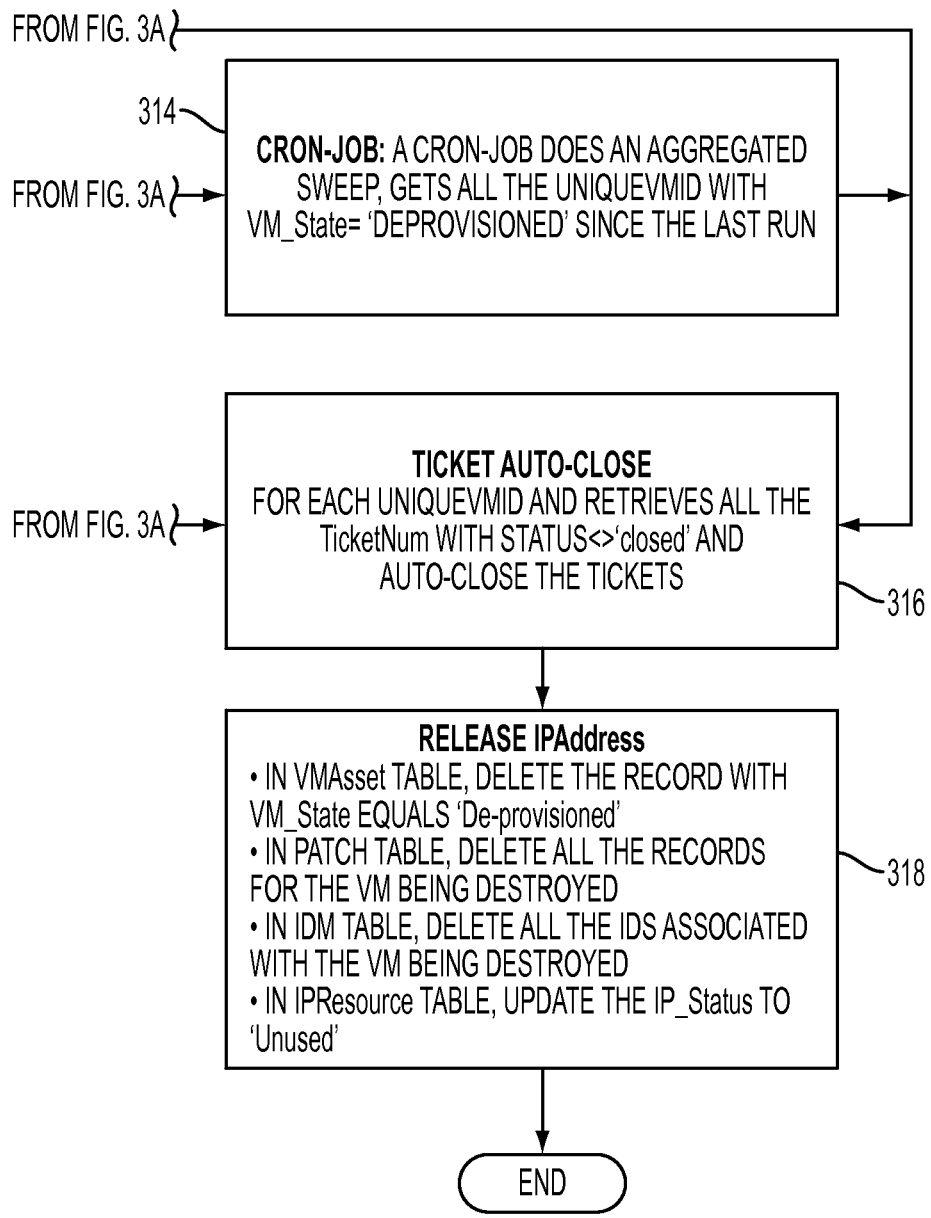

FIGS. 3A and 3B are a flow diagram illustrating a method of deactivating a VM or the like service to enable effective resource reusability in one embodiment of the present disclosure. At 302, a customer submits a request to a Service Management System or the like to destroy a VM. At 304, the Service Management submits a service request to create a change record and sets the VM_State='De-provision Inprogress' in VMAsset table. At 306, based on the customer_Name and VM_ipadress, the UNIQUE_VMID and cloud_instance_id are retrieved from VMAsset table. Based on the number of resources available, one of three optional paths may be taken for deactivation of managed services of VM. The following logic uses IP address as an example resource. However, the method shown may apply to any other resources. At 308, using the cloud_instance_id, the number of 'available' IP addresses, NUM_IP, is obtained. At 310, if Num_IP is less the number that should be in reserve, Lower_IPReserve, then the logic proceeds to 322, for Incident Management System automation. Lower_IPReserve, for example, may be a configurable number that specifies the minimum number or such threshold number of IP addresses or another resource that should be reserved as available at any time.

If not, at 312, if Lower_IPReserve<=Num_IP<Upper_IPReserve, then the logic proceeds to 320 for event-based automation. Upper_IPReserve, for example, may be an upper bound number and may be configurable. Otherwise, if Num_IP is >=Upper_IPReserve, then the logic proceeds to 314 for cron-job or scheduled-job based automation.

The processing at 322 shows request-based automation of deactivation of managed services. In the request-based automation, the service request created at 304 may call the workflow that performs actions for closing and/or updating the statuses of all pending activities and/or incident/problem tickets associated with the VM being removed to 'closed'.

The processing at 320 illustrates event-based automation of deactivation of managed services called directly from the Service Management component 104. In event-based automation, the changing of record, VM_State to 'De-provision Inprogress' at 304 triggers a service request in the provisioning system to destroy the VM identified by the UNIQUE_VMID. Provisioning system sends notification to Event Management system with UNIQUE_VMID of the VM being destroyed. In one aspect, a system administrator (Sys Admin) console is updated as well to reflect the ticket status.

The processing at 314 illustrates a deactivation automation by scheduled or cron-job route. For instance, a cron-job receives all the UNIQUE_VMID with VM_State='De-provisioned' since the last run. The processing at 316 illustrates, for each UNIQUE_VMID, all the TicketNum with status<>'closed' are retrieved and those tickets are automatically closed.

At 318, the resources are released. For example, for a given UNIQUE_VMID, associated table entries may be updated to reflect the status of release. For instance, the VM_State in VMAsset table is updated to 'De-provisioned' or the record deleted; the IP_Status in IPResource table is updated to 'Available'.

Figure 4:
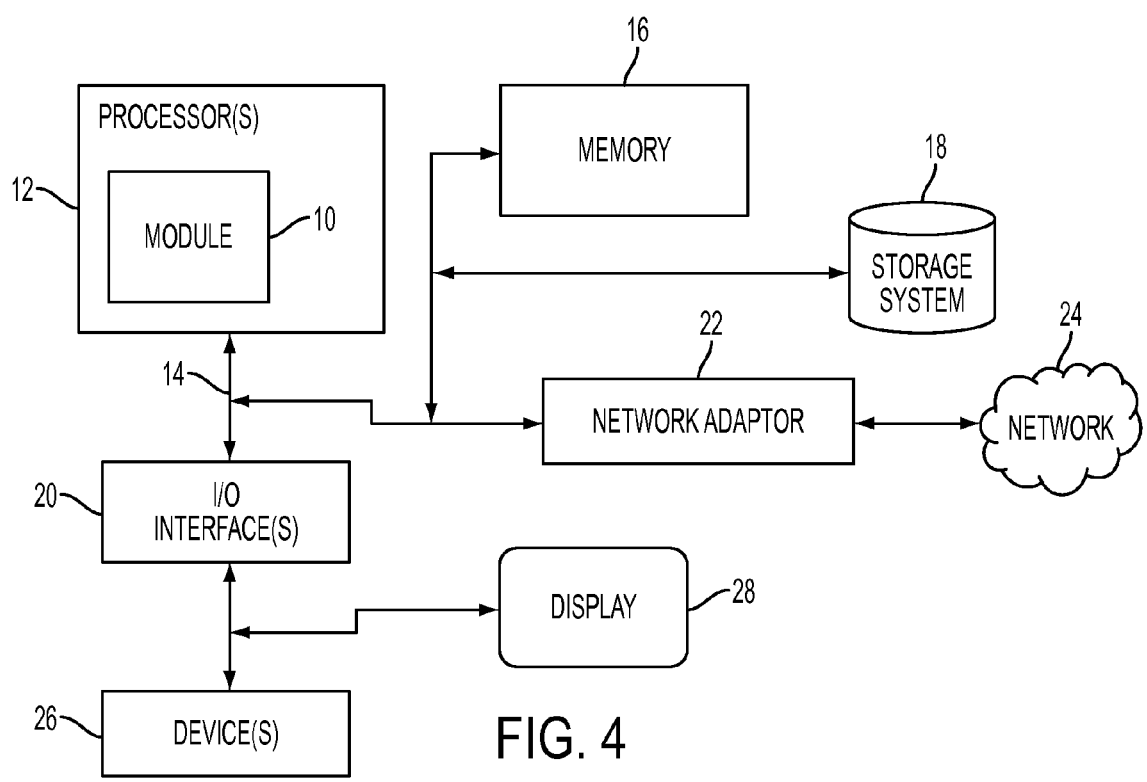
FIG. 4 illustrates a schematic of an example computer or processing system that may implement the system in one embodiment of the present disclosure.

FIG. 4 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for automated deactivation of managed service to enable effective resource reusability in a computing system, comprising:
   receiving a request to destroy a virtual machine, the virtual machine running in a virtual data center comprising one or more software components allocated for servicing a customer;
   notifying a provisioning module to remove the virtual machine;
   determining a number of resources left available in the virtual data center;
   in response to determining that the number of resources left available is less than a defined threshold value, sending a notification to one or more modules that manage activities associated with the virtual machine to disable managing the activities, closing all pending activities on the virtual machine, and releasing all resources used by the virtual machine concurrently with the provisioning module removing the virtual machine; and
   in response to determining that the number of resources left available is greater than or equal to the defined threshold value, scheduling the sending, the closing and the releasing to be performed at a scheduled time,
   wherein a decision of whether the deactivation of managed services should take place now as event-based or later as part of a periodic scheduled job is determined based on the number of resources left available.

2. The method of claim 1, wherein the resources comprise IP addresses used for the virtual machine.

3. The method of claim 1, wherein the resources comprise user identifier associated with the virtual machine.

4. The method of claim 1, wherein the defined threshold value is configurable.

5. The method of claim 1, wherein the one or more modules comprise an event management module, a patch management module, an identification management module, backup management module, or asset management module, or combinations thereof.

6. The method of claim 1, wherein the activities comprise monitoring the virtual machine, creating incident tickets associated with one or more artifacts provisioned on the virtual machine, managing update codes associated with the virtual machine managing user identifiers on the virtual machine, managing assets on the virtual machine, or managing backups on the virtual machine, or combinations thereof.

7. The method of claim 1, wherein the step of sending a notification to one or more modules that manage activities associated with the virtual machine to disable managing the activities, closing all pending activities on the virtual machine, and releasing all resources used by the virtual machine concurrently with the provisioning module removing the virtual machine in response to determining that the number of resources left available is less than a defined threshold value, occurs as a service request that invokes the sending, the closing and the releasing.

8. The method of claim 7, wherein the step of sending a notification to one or more modules that manage activities associated with the virtual machine to disable managing the activities, closing all pending activities on the virtual machine, and releasing all resources used by the virtual machine concurrently with the provisioning module removing the virtual machine in response to determining that the number of resources left available is less than a defined threshold value, is triggered as a result of event status update.

9. The method of claim 1, wherein the releasing of all resources used by the virtual machine includes updating one or more data tables associated with the virtual machine.

10. A computer readable storage medium storing a program of instructions executable by a machine to perform a method of automated deactivation of managed service to enable effective resource reusability in a computing system, comprising:
   receiving a request to destroy a virtual machine, the virtual machine running in a virtual data center comprising one or more software components allocated for servicing a customer;
   notifying a provisioning module to remove the virtual machine;
   determining a number of resources left available in the virtual data center;
   in response to determining that the number of resources left available is less than a defined threshold value, sending a notification to one or more modules that manage activities associated with the virtual machine to disable managing the activities, closing all pending activities on the virtual machine, and releasing all resources used by the virtual machine concurrently with the provisioning module removing the virtual machine; and
   in response to determining that the number of resources left available is greater than or equal to the defined threshold value, scheduling the sending, the closing and the releasing to be performed at a scheduled time,
   wherein a decision of whether the deactivation of managed services should take place now as event-based or later as part of a periodic scheduled job is determined based on the number of resources left available.

11. The computer readable storage medium of claim 10, wherein the resources comprise IP addresses used for the virtual machine.

12. The computer readable storage medium of claim 10, wherein the resources comprise user identifier associated with the virtual machine.

13. The computer readable storage medium of claim 10, wherein the defined threshold value is configurable.

14. The computer readable storage medium of claim 10, wherein the one or more modules comprise an event management module, a patch management module, an identification management module, backup management module, or asset management module, or combinations thereof.

15. The computer readable storage medium of claim 10, wherein the activities comprise monitoring the virtual machine, creating incident tickets associated with one or more artifacts provisioned on the virtual machine, managing update codes associated with the virtual machine managing user identifiers on the virtual machine, managing assets on the virtual machine, or managing backups on the virtual machine, or combinations thereof.

16. The computer readable storage medium of claim 10, wherein the step of sending a notification to one or more modules that manage activities associated with the virtual machine to disable managing the activities, closing all pending activities on the virtual machine, and releasing all resources used by the virtual machine concurrently with the provisioning module removing the virtual machine in response to determining that the number of resources left available is less than a defined threshold value, occurs as a service request that invokes the sending, the closing and the releasing.

17. The computer readable storage medium of claim 16, wherein the step of sending a notification to one or more modules that manage activities associated with the virtual machine to disable managing the activities, closing all pending activities on the virtual machine, and releasing all resources used by the virtual machine concurrently with the provisioning module removing the virtual machine in response to determining that the number of resources left available is less than a defined threshold value, is triggered as a result of event status update.

18. The computer readable storage medium of claim 10, wherein the releasing of all resources used by the virtual machine includes updating one or more data tables associated with the virtual machine.

19. A system of automated deactivation of managed service to enable effective resource reusability in a computing system, comprising:
   a service management system comprising at least a processor, the service management system operable to receive a request to destroy a virtual machine running in a virtual data center comprising one or more software components allocated for servicing a customer,
   the service management system further operable to notify a provisioning module executing in the virtual data center to remove the virtual machine,
   the service management system further operable to determine a number of resources left available in the virtual data center,
   in response to determining that the number of resources left available is less than a defined threshold value, the service management system further operable to send a notification to one or more modules that manage activities associated with the virtual machine to disable managing the activities, closing all pending activities on the virtual machine, and releasing all resources used by the virtual machine concurrently with the provisioning module removing the virtual machine, and
   in response to determining that the number of resources left available is greater than or equal to the defined threshold value, the service management system is further operable to schedule the sending, the closing and the releasing to be performed at a scheduled time,
   wherein a decision of whether the deactivation of managed services should take place now as event-based or later as part of a periodic scheduled job is determined based on the number of resources left available.

20. The system of claim 19, wherein the resources comprise IP addresses used for the virtual machine.

21. The system of claim 19, wherein the resources comprise user identifier associated with the virtual machine.

22. The system of claim 19, wherein the defined threshold value is configurable.

23. The system of claim 19, wherein the one or more modules comprise an event management module, a patch management module, an identification management module, backup management module, or asset management module, or combinations thereof.

24. The system of claim 19, wherein the activities comprise monitoring the virtual machine, creating incident tickets associated with one or more artifacts provisioned on the virtual machine, managing update codes associated with the virtual machine managing user identifiers on the virtual machine, managing assets on the virtual machine, or managing backups on the virtual machine, or combinations thereof.

* * * * *